US012443662B1

(12) United States Patent
Watson et al.

(10) Patent No.: US 12,443,662 B1
(45) Date of Patent: Oct. 14, 2025

(54) SYSTEM AND METHOD FOR GENERATING ORDER AGNOSTIC DYNAMIC CITATION NETWORK

(71) Applicant: JPMorgan Chase Bank, N.A., New York, NY (US)

(72) Inventors: William Watson, Long Beach, NY (US); Naan Cho, New York, NY (US); Tucker Richard Balch, Suwanee, GA (US); Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/744,131

(22) Filed: Jun. 14, 2024

(51) Int. Cl.
*G06F 16/00* (2019.01)
*G06F 16/901* (2019.01)
*G06F 16/93* (2019.01)

(52) U.S. Cl.
CPC .......... *G06F 16/9024* (2019.01); *G06F 16/93* (2019.01)

(58) Field of Classification Search
CPC .............................. G06F 16/9024; G06F 16/93
See application file for complete search history.

(56) References Cited

U.S. PATENT DOCUMENTS

| 2018/0157662 A1* | 6/2018 | Chin ................. G06F 16/90335 |
| 2020/0167785 A1* | 5/2020 | Kursun ................. H04L 43/045 |
| 2020/0265075 A1* | 8/2020 | Knapp ................. G06F 16/335 |
| 2023/0132061 A1* | 4/2023 | Pfitzmann ............. G06F 40/295 706/45 |

* cited by examiner

*Primary Examiner* — Dinku W Gebresenbet
(74) *Attorney, Agent, or Firm* — GREENBLUM & BERNSTEIN, P.L.C.

(57) ABSTRACT

A method and system for generating a dynamic graph network for a plurality of documents in a corpus are disclosed. The method includes analyzing a first document among the plurality of documents included in the corpus; generating a first node for the first document in the dynamic graph network; extracting one or more values included in the first document; assigning a key for each of the one or more values included in the first document; identifying at least one entity for the one or more values extracted from the first document; generating a second node for the at least one entity in the dynamic graph network; setting a status identifier for each of the first node and the second node generated; generating a first edge for the first node and the second node; and establishing a connection between the first node and the second node via the first edge.

13 Claims, 12 Drawing Sheets

Each cluster represents a disjoint set of document citations

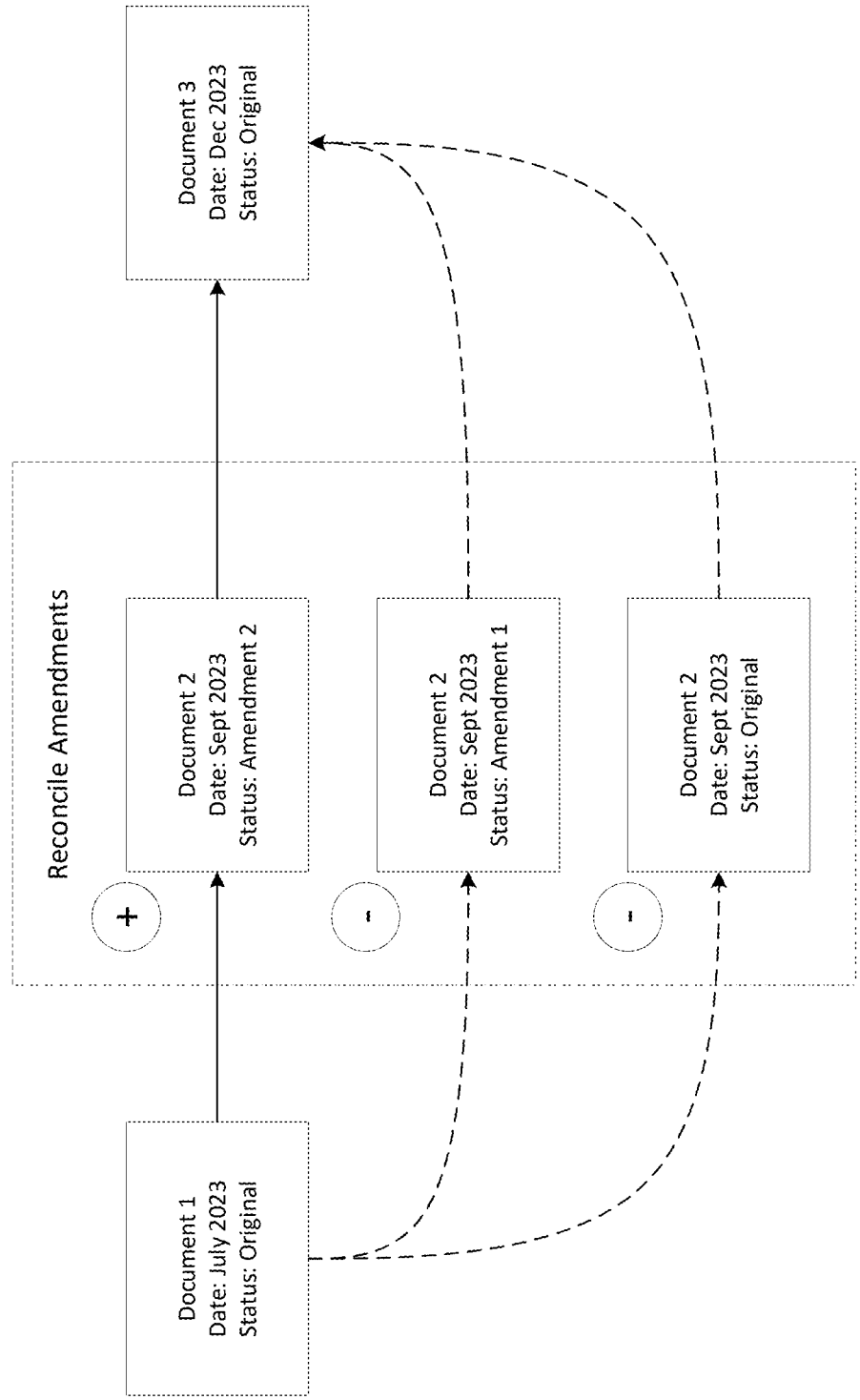

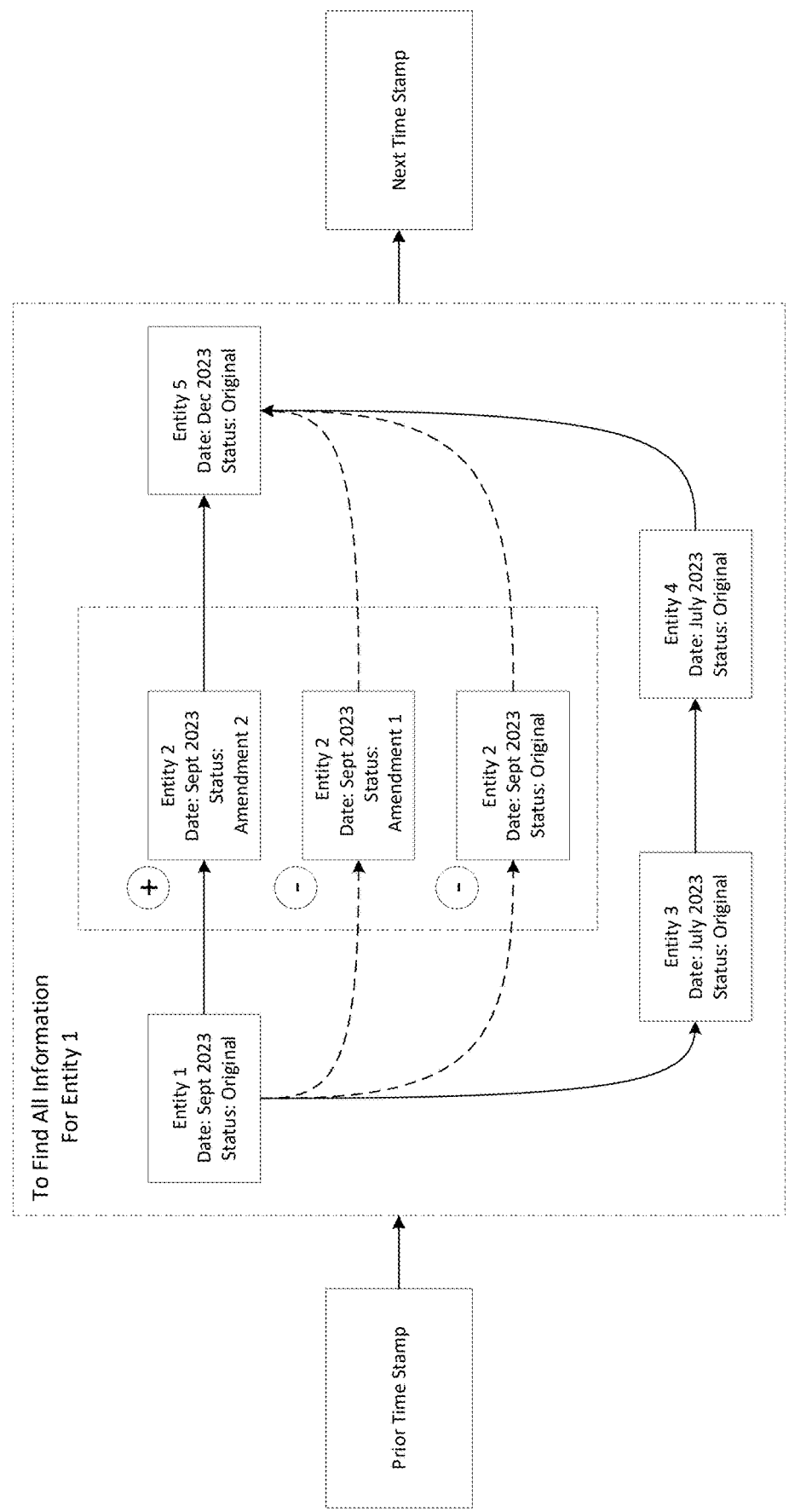

SYSTEM AND METHOD FOR GENERATING ORDER AGNOSTIC DYNAMIC CITATION NETWORK

TECHNICAL FIELD

This disclosure generally relates to generation of a dynamic graph network for a set of documents included in a corpus. More specifically, the present disclosure relates to generating a read-order agnostic graph network that may be modified in structure as additional documents or entities are added to a corpus without specific sequence or order.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Conventional information extraction may be performed on a document, in order to extract out relevant data from the respective document. However, such information extraction may require a user to view the document in isolation.

A single document can contain a plethora of information to extract and analyze. However, it is important to consider this document in the context of a larger collection of documents, known as a corpus. When viewed in isolation, the content of a single document may not provide all the relevant information about a particular entity or topic. Therefore, some corpus may, in aggregate, provide a complete view of the underlying data that is, in reality, scattered across individual documents.

However, documents within the corpus may not be created at the same time. Further, conventional graph network generation technology may rely on specific read order of documents, such that a wrong read order of documents is established, an erroneous graph network may be generated. In particular, although some automated interlinking of documents may be possible in the conventional technology, the conventional automated interlinking of documents relies on specific sequence of read order, as opposed to content of such documents. Accordingly, the later read or processed document is assumed to be the latest document in the graph network even if the document may be an earlier originated document.

Moreover, conventional graph network generation may generate a graph network that is immutable, such that any connections or nodes generated may not be editable once established. Accordingly, any edits to an existing document included in the conventional graph network may be required to be added as a new later dated document. As a result of the above noted technological limitations of conventional graph network generation technology, relationships between the documents shown by conventional graph network generation technology may often be incomplete or incorrect and requires high precision in read order of documents.

SUMMARY

According to an aspect of the present disclosure, a method for generating a dynamic graph network for a plurality of documents in a corpus is provided. The method includes analyzing, by a processor, a first document among the plurality of documents included in the corpus; generating, by the processor, a first node for the first document in the dynamic graph network; extracting, by the processor, one or more values included in the first document; assigning, by the processor, a key for each of the one or more values included in the first document; identifying, by the processor, at least one entity for the one or more values extracted from the first document; generating, by the processor, a second node for the at least one entity in the dynamic graph network; setting, by the processor, a status identifier for each of the first node and the second node generated; generating, by the processor, a first edge for the first node and the second node; and establishing, by the processor, a connection between the first node and the second node via the first edge.

According to another aspect of the present disclosure, at least two of the plurality of documents have differing origination or modification dates.

According to another aspect of the present disclosure, the plurality of documents were added to the corpus in a random order.

According to yet another aspect of the present disclosure, the method further includes adding, by the processor, a second document to the corpus, wherein the second document is added to the corpus subsequent to the first document.

According to another aspect of the present disclosure, the second document has an earlier origination date than the first document.

According to a further aspect of the present disclosure, the second document has a later origination date than the first document.

According to yet another aspect of the present disclosure, the second document is designated to the second node that was generated prior to the second document being added to the corpus.

According to a further aspect of the present disclosure, a node is generated in the dynamic graph network prior to a corresponding document being added to the corpus.

According to another aspect of the present disclosure, the second document is an updated version of the first document.

According to a further aspect of the present disclosure, the method further includes generating, by the processor, a third node for the updated first document; severing, by the processor, the connection between the first node and the second node established via the first edge; generating, by the processor, a second edge for the third node and the second node; establishing, by the processor, a connection between the third node and the second node via the second edge; updating, by the processor, the status identifier for the second document to reflect an amendment to the first document; and reconciling, by the processor, the first document and the second document, such that the first document and the second document are linked while information included in the first document is bypassed.

According to a further aspect of the present disclosure, the first document has an origination date that is later than at least one of the plurality of documents for which a node has not yet been generated.

According to a further aspect of the present disclosure, the method further includes generating, by the processor, a fourth node for the second document; inserting, by the processor, the fourth node between the first node and the second node; severing, by the processor, the connection between the first node and the second node; and establishing, by the processor, a connection between the first node and the fourth node and a connection between the fourth node and the second node.

According to a further aspect of the present disclosure, an origination date of a document corresponding to the second node is later than the second document corresponding to the fourth node.

According to a further aspect of the present disclosure, an origination date of a document corresponding to the second node is not yet established as the document corresponding to the second node is not yet added to the corpus.

According to a further aspect of the present disclosure, the method further includes extracting, by the processor, one or more values included in the second document; assigning, by the processor, a key for each of the one or more values included in the second document; and detecting, by the processor, one or more changes in the second document based on one or more keys of the first document and one or more keys of the second document.

According to a further aspect of the present disclosure, the one or more changes include an amendment to the first document or a temporal change between the second document and the first document.

According to a further aspect of the present disclosure, the method further includes receiving, by the processor, a selection of the first node of the dynamic graph network; checking, by the processor, one or more connections stemming from the first node indicating a delegation to another document; checking, by the processor, at least one connection of one or more nodes connected to the first node and identifying at least one connection to one or more other nodes that stems from the one or more nodes connected to the first node; aggregating, by the processor, one or more documents corresponding to the one or more other nodes; and displaying, by the processor, the aggregated one or more documents to provide a holistic view of the first document.

According to a further aspect of the present disclosure, the method further includes revisiting and reestablishing one or more connections of the first node when the second document is added to the corpus.

According to an aspect of the present disclosure, a system for generating a dynamic graph network for a plurality of documents in a corpus is provided. The system includes a memory, a display and a processor. The system is configured to perform: analyzing a first document among the plurality of documents included in the corpus; generating a first node for the first document in the dynamic graph network; extracting one or more values included in the first document; assigning a key for each of the one or more values included in the first document; identifying at least one entity for the one or more values extracted from the first document; generating a second node for the at least one entity in the dynamic graph network; setting a status identifier for each of the first node and the second node generated; generating a first edge for the first node and the second node; and establishing a connection between the first node and the second node via the first edge.

According to another aspect of the present disclosure, a non-transitory computer readable storage medium that stores a computer program for generating a dynamic graph network for a plurality of documents in a corpus is provided. The computer program, when executed by a processor, causes a system to perform multiple processes including: analyzing a first document among the plurality of documents included in the corpus; generating a first node for the first document in the dynamic graph network; extracting one or more values included in the first document; assigning a key for each of the one or more values included in the first document; identifying at least one entity for the one or more values extracted from the first document; generating a second node for the at least one entity in the dynamic graph network; setting a status identifier for each of the first node and the second node generated; generating a first edge for the first node and the second node; and establishing a connection between the first node and the second node via the first edge.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIGS. 7A-7E illustrate dynamically generated citation graph networks in accordance with exemplary embodiments of the present disclosure.

DETAILED DESCRIPTION

Figure 1:
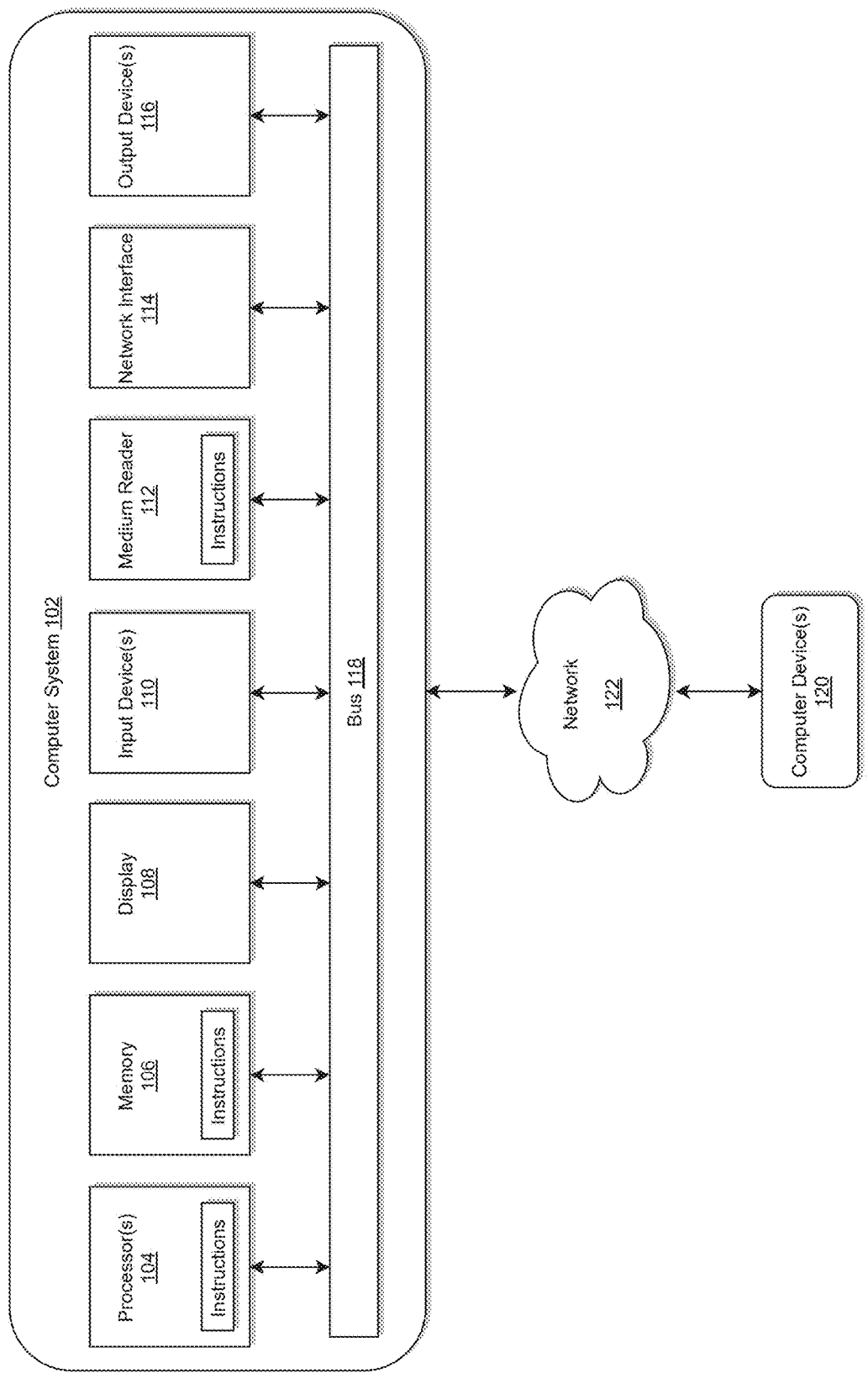
FIG. 1 illustrates a computer system for implementing a dynamic citation network generation (DCNG) system for generating a dynamic graph network in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a dynamic citation network generation (DCNG) system for generating a dynamic graph network in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component.

The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, or the like.

The computer system 102 may be in communication with one or more additional computer devices 120 via a network 122. The network 122 may be, but is not limited thereto, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
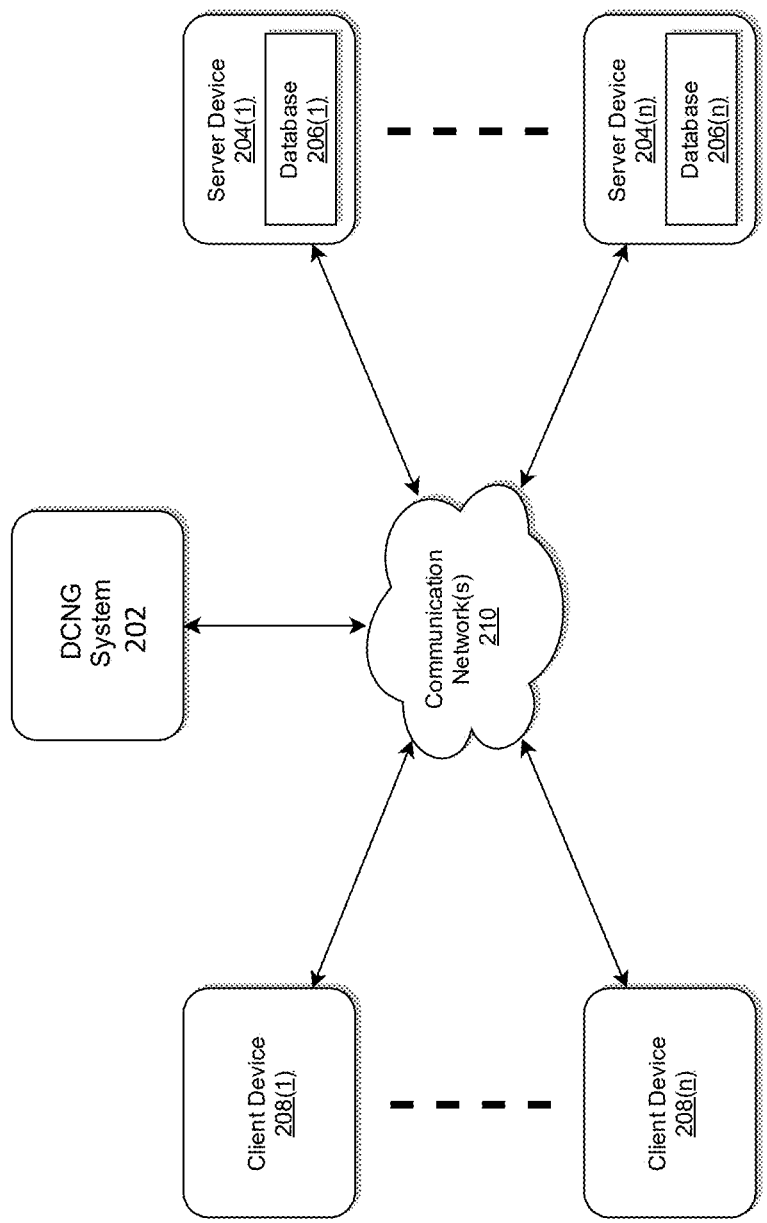
FIG. 2 illustrates an exemplary diagram of a network environment with a DCNG system for generating a dynamic graph network in accordance with an exemplary embodiment.

FIG. 2 illustrates an exemplary diagram of a network environment with a DCNG system for generating a dynamic graph network in accordance with an exemplary embodiment.

An DCNG system 202 may be implemented with one or more computer systems similar to the computer system 102 as described with respect to FIG. 1.

The DCNG system 202 may store one or more applications that can include executable instructions that, when executed by the DCNG system 202, cause the DCNG system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the DCNG system 202 itself, may be located in virtual server(s) running in a cloud-based computing environment rather than being tied to one or more specific physical network computing devices. Also, the application(s) may be running in one or more virtual machines (VMs) executing on the DCNG system 202. Additionally, in one or more embodiments of this technology, virtual machine(s) running on the DCNG system 202 may be managed or supervised by a hypervisor.

In the network environment 200 of FIG. 2, the DCNG system 202 is coupled to a plurality of server devices 204(1)-204 (*n*) that hosts a plurality of databases 206(1)-206 (*n*), and also to a plurality of client devices 208(1)-208 (*n*) via communication network(s) 210. According to exemplary aspects, databases 206(1)-206 (*n*) may be configured to store data that relates to documents, entities, version information, status identifiers, origination dates, modification dates and the like. A communication interface of the DCNG system 202, such as the network interface 114 of the computer system 102 of FIG. 1, operatively couples and communicates between the DCNG system 202, the server devices 204(1)-204 (*n*), and/or the client devices 208(1)-208 (*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG.

1, although the DCNG system 202, the server devices **204(1)-204 (*n*), and/or the client devices 208(1)-208 (*n*) may be coupled together via other topologies. Additionally, the network environment 200** may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DCNG system 202 may be a standalone device or integrated with one or more other devices or apparatuses, such as one or more of the server devices **204(1)-204 (*n*), for example. In one particular example, the DCNG system 202 may be hosted by one of the server devices 204(1)-204 (*n*), and other arrangements are also possible. Moreover, one or more of the devices of the DCNG system 202** may be in the same or a different communication network including one or more public, private, or cloud networks, for example.

The plurality of server devices **204(1)-204 (*n*) may be the same or similar to the computer system 102 or the computer device 120 as described with respect to FIG. 1, including any features or combination of features described with respect thereto. For example, any of the server devices 204(1)-204 (*n*) may include, among other features, one or more processors, a memory, and a communication interface, which are coupled together by a bus or other communication link, although other numbers and/or types of network devices may be used. The server devices 204(1)-204 (*n*) in this example may process requests received from the DCNG system 202 via the communication network(s) 210** according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices **204(1)-204 (*n*) may be hardware or software or may represent a system with multiple servers in a pool, which may include internal or external networks. The server devices 204(1)-204 (*n*) hosts the databases 206(1)-206 (*n*)** that are configured to store metadata sets, data quality rules, and newly generated data.

Although the server devices **204(1)-204 (*n*) are illustrated as single devices, one or more actions of each of the server devices 204(1)-204 (*n*) may be distributed across one or more distinct network computing devices that together comprise one or more of the server devices 204(1)-204 (*n*). Moreover, the server devices 204(1)-204 (*n*) are not limited to a particular configuration. Thus, the server devices 204(1)-204 (*n*) may contain a plurality of network computing devices that operate using a master/slave approach, whereby one of the network computing devices of the server devices 204(1)-204 (*n*)** operates to manage and/or otherwise coordinate operations of the other network computing devices.

The server devices **204(1)-204 (*n*)** may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices **208(1)-208 (*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204 (*n*) or other client devices 208(1)-208 (*n*)**.

According to exemplary embodiments, the client devices **208(1)-208 (*n*) in this example may include any type of computing device that can facilitate the implementation of the DCNG system 202** that may efficiently provide a platform for implementing a cloud native DCNG system module, but the disclosure is not limited thereto.

The client devices **208(1)-208 (*n*) may run interface applications, such as standard web browsers or standalone client applications, which may provide an interface to communicate with the DCNG system 202 via the communication network(s) 210 in order to communicate user requests. The client devices 208(1)-208 (*n*)** may further include, among other features, a display device, such as a display screen or touchscreen, and/or an input device, such as a keyboard, for example.

Although the exemplary network environment 200 with the DCNG system 202, the server devices **204(1)-204 (*n*), the client devices 208(1)-208 (*n*), and the communication network(s) 210** are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DCNG system 202, the server devices **204(1)-204 (*n*), or the client devices 208(1)-208 (*n*), for example, may be configured to operate as virtual instances on the same physical machine. For example, one or more of the DCNG system 202, the server devices 204(1)-204 (*n*), or the client devices 208(1)-208 (*n*) may operate on the same physical device rather than as separate devices communicating through communication network(s) 210. Additionally, there may be more or fewer DCNG system 202, server devices 204(1)-204 (*n*), or client devices 208(1)-208 (*n*) than illustrated in FIG. 2. According to exemplary embodiments, the DCNG system 202 may be configured to send code at run-time to remote server devices 204(1)-204 (*n*)**, but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
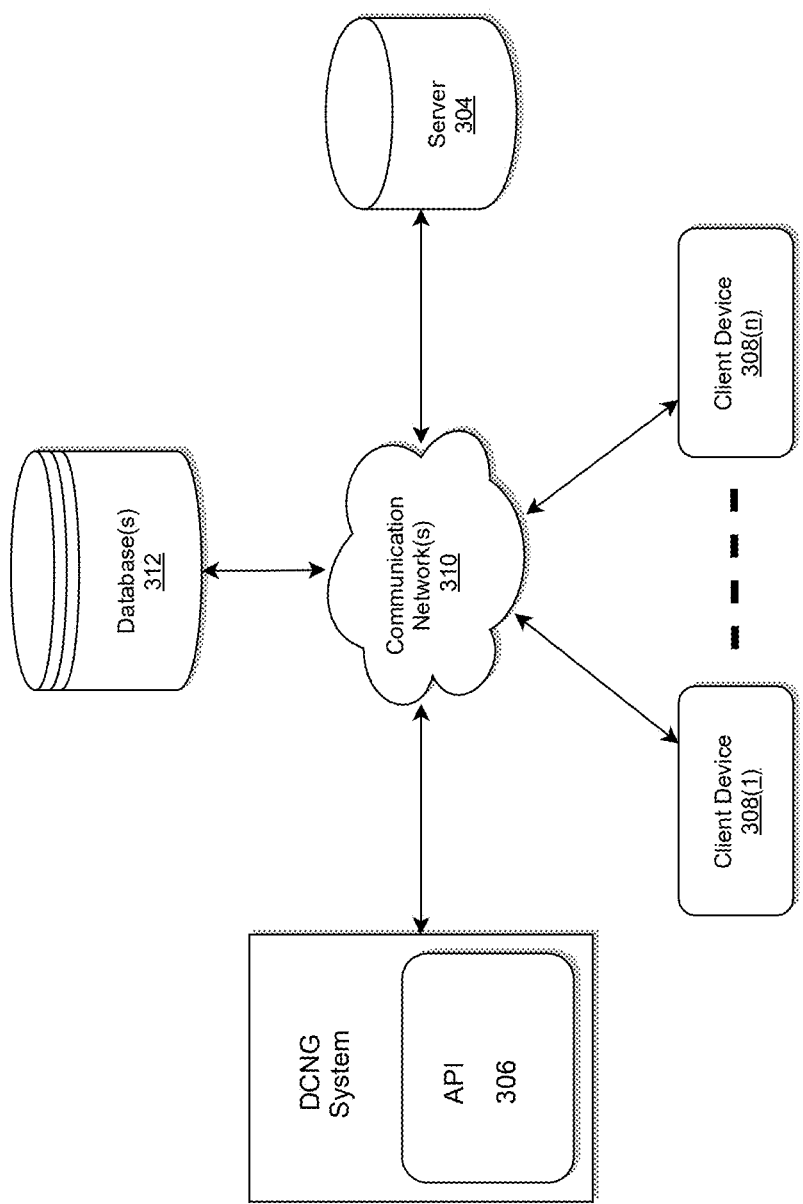
FIG. 3 illustrates a system diagram for implementing a DCNG system for generating a dynamic graph network in accordance with an exemplary embodiment.

FIG. 3 illustrates a system diagram for implementing a DCNG system for generating a dynamic graph network in accordance with an exemplary embodiment.

As illustrated in FIG. 3, the system 300 may include an DCNG system 302 within which a group of API modules 306 is embedded, a server 304, a database(s) 312, a plurality of client devices 308(1) . . . 308 (n), and a communication network 310.

According to exemplary embodiments, the DCNG system 302 including the API modules 306 may be connected to the server 304, and the database(s) 312 via the communication network 310. Although there is only one database that has been illustrated, the disclosure is not limited thereto. Any number of databases may be utilized. The DCNG system 302 may also be connected to the plurality of client devices 308(1) . . . 308 (n) via the communication network 310, but the disclosure is not limited thereto.

According to exemplary embodiment, the DCNG system 302 is described and shown in FIG. 3 as including the API modules 306, although it may include other rules, policies, modules, databases, or applications, for example. According to exemplary embodiments, the database(s) 312 may be embedded within the DCNG system 302. According to exemplary embodiments, the database(s) 312 may be configured to store configuration details data corresponding to a desired data to be fetched from one or more data sources, but the disclosure is not limited thereto.

According to exemplary embodiments, the API modules 306 may be configured to receive real-time feed of data or data at predetermined intervals from the plurality of client devices 308(1) . . . 308 (n) via the communication network 310.

The API modules 306 may be configured to implement a user interface (UI) platform that is configured to enable DCNG system as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308 (n) are illustrated as being in communication with the DCNG system 302. In this regard, the plurality of client devices 308(1) . . . 308 (n) may be "clients" of the DCNG system 302 and are described herein as such. Nevertheless, it is to be known and understood that the plurality of client devices 308 (1) 308 (n) need not necessarily be "clients" of the DCNG system 302, or any entity described in association therewith herein. Any additional or alternative relationship may exist between either or both of the plurality of client devices 308(1) . . . 308 (n) and the DCNG system 302, or no relationship may exist.

The first client device 308(1) may be, for example, a smart phone. Of course, the first client device 308(1) may be any additional device described herein. The second client device 308 (n) may be, for example, a personal computer (PC). Of course, the second client device 308 (n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308 (n) may communicate with the DCNG system 302 via broadband or cellular communication. Of course, these embodiments are merely exemplary and are not limiting or exhaustive.

The client devices 308(1) . . . 308 (n) may be the same or similar to any one of the client devices 208(1)-208 (n) as described with respect to FIG. 2, including any features or combination of features described with respect thereto. The DCNG system 302 may be the same or similar to the DCNG system 202 as described with respect to FIG. 2, including any features or combination of features described with respect thereto.

Figure 4:
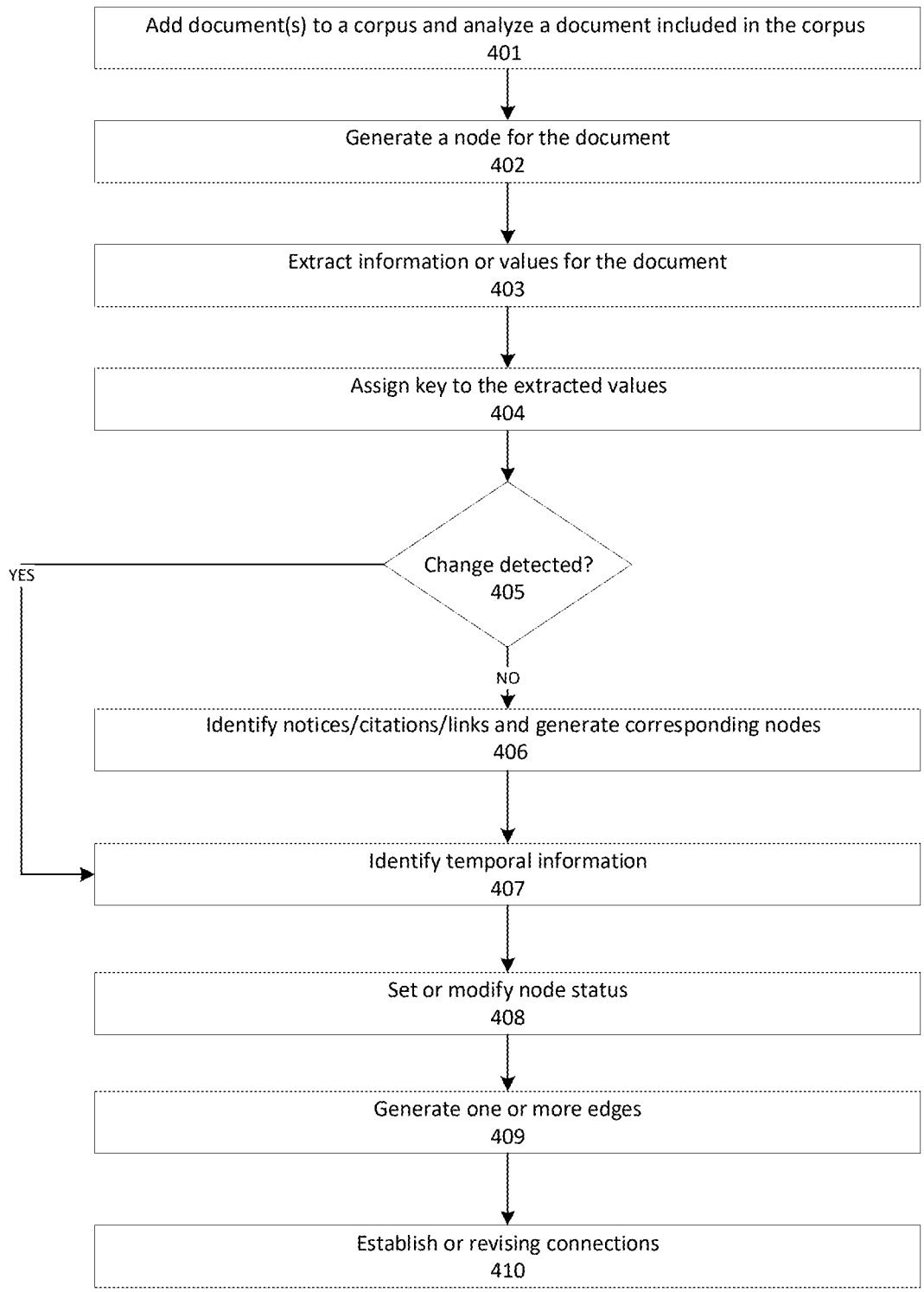
FIG. 4 illustrates a method for dynamically generating a citation graph network in accordance with an exemplary embodiment.

FIG. 4 illustrates a method for dynamically generating a citation graph network in accordance with an exemplary embodiment.

According to exemplary aspects, the presently disclosed system and method generate a dynamic graph network that may capture citations or references to related documents. By understanding the connections and aggregate data across documents, a user or computing system may gain a more comprehensive view of the underlying data that may be scattered across individual documents. For instance, a governmental filing may allow filing managers to delegate reporting on behalf of another, which in turn may delegate to another. In view of such a scenario, exemplary aspects of the present disclosure seek to generate citation links between documents, while retroactively altering portions of the network graph upon new document generation or filings across time, allowing tracking flows of information and updating of the network graph as new documents or filings are added over time, or as documents are revised and edited. By creating of such dynamic graph network of citations, valuable insights and patterns may be uncovered, which may not be as apparent when considering documents in isolation as conventionally done.

According to exemplary aspects, information extraction may be performed at a document level or at a corpus level. Based on such extraction, exemplary system and method may generate complete views of any entity across its individual documents within a corpus. Accordingly, no document is observed in isolation. Rather, the individual documents may interlink and provide alternative or supplementary information for each other.

One of the difficulties with interlinking of documents within a corpus is the dynamic nature of the corpus, in which new documents may be added to the corpus to supersede or amend prior documents over time. In particular, there are two main challenges with these types of datasets that the exemplary system and method seek to address. The first challenge is understanding of inter-document relationships across a corpus, including citations, references, pointers and the like. The second challenge is retroactively updating the network to incorporate amended documents or add new superseding documentation.

In view of the above noted technological challenges and/or limitations, exemplary aspects of the present application provide an order-agnostic and temporal agnostic generative graph building algorithm to connect various entities or documents together across time for efficient aggregation as exemplarily described with respect to FIG. 4, FIG. 6 and FIGS. 7A-7E.

In operation 401, one or more documents may be added to a corpus and a document within the corpus is analyzed. According to exemplary aspects, the one or more documents may be added to the corpus at any random order without any particular sequence. As exemplarily illustrated in FIG. 5, a corpus may be a set or cluster of documents that may be related to one another. As exemplarily illustrated, the documents within a corpus may have differing relationships with other documents. Each of the documents may be represented as a node, with relationships between the documents being represented by lines or edges between the nodes. For example, the documents may have a top-down relationship, a centralized relationship, a hybrid relationship and the like. Depending on the relationships or citations between the documents, communication between the documents may be flowing in a singular direction, multiple directions, and back-and-forth direction (i.e., documents exchange information).

According to exemplary aspects, documents within the corpus may be analyzed one at a time or in multiples. In an example, documents included in the corpus may be processed based on times stamp information, name of the document, document size, in a random order, or in any other order. According to exemplary aspects, each of the documents included in the corpus may be one of many types or categories. For example, a document may be a notice type, an intermediate document type, and a final or complete document type. The notice type may refer to a document that may contain no information except, which document will contain information on behalf of this document's entity. The intermediate document type may refer to a document that includes partial information, with a portion field in another report on behalf of the current entity. The final or complete document type may refer to a complete record for an entity, which may include other entities that delegated to the respective document for reporting. Although three document types are disclosed herein, aspects of the present disclosure are not limited thereto, such that other document types may be available.

In operation 402, a node for the document is dynamically generated for a graph network. According to exemplary aspects, a node on the graph network may correspond to a document. However, aspects of the present disclosure are not limited thereto, such that multiple nodes may correspond to a single document having multiple parts. According to further aspects, nodes may be inserted in any order. For example, future anticipated nodes may be added as placeholders and matched to incoming documents for replacement. These placeholders may hold pointer information to resolve older node connections to the newly inserted nodes.

As exemplarily illustrated in FIGS. 7A-7E, a graph network may refer to a data structure that contains two sets of values, namely, a set of vertices (e.g., nodes, documents, points and etc.) and a set of pairs of vertices referred to as edges, links, connections and/or citations. According to exemplary aspects, edges or connections may refer to citations or delegations between documents. Moreover, the edges may be directed or undirected. In an example, the directed edges may refer to a direction of flow or order, such that an edge (A, B) may indicate node A points to node B, but node B does not point to node A unless (B, A) is included in an edge set. On the other hand, the undirected edges may refer to an edge having a mutual connection, such that an edge (A, B) may indicate a mutual connection from node A to node B, and also node B to node A. Each vertex may contain information for a specific document.

According to exemplary aspects, the DCNG system and method may execute a proprietary algorithm for generating a dynamic graph by having a sub-graph for each temporal time period that may make temporal edge citations to other temporal subgraphs. Further, in each temporal graph, a node is generated per each entity document. Moreover, amendments may be chained as seen in at least FIG. 7C, where the most recent amendment may take precedence and stored in a sorted order.

In operation 403, various information or values may be extracted from the document. In example, select targeted information or values may be extracted. Alternatively, information or values may be extracted and then filtered to retain only the targeted information or values, while removing or deleting information or values deemed as unnecessary for conserving memory storage. According to exemplary aspects, extracted information of values may include, without limitation, title of the document, entities indicated in the respective document, one or more time periods for the document (e.g., creation date, filing date, period reporting date, modification date and the like), version information (e.g., amendment number) and the like. In an example, version information or the amendment number may be reconciled by matching the previous information but at a later creation/filing date.

In operation 404, one or more keys are assigned to the extracted information or values. According to exemplary aspects, a key may be an identifier for the extracted information or value.

In operation 405, a check is performed to determine or detect whether a change was made in the document. According to exemplary aspects, changes may be identified via amendments and temporal changes. More specifically, amendment based changes may be detected based on differences between the amendment and its adjacent version. In example, amendment based changes may include new, amended/modified or deleted information between two version of the document. Temporal changes may be similar, but different detected is against the latest version of a document across a timeline (as opposed within the document for an amendment). Temporal changes may be based on new, deleted or amended information.

In an example, a new document may not have any changes as the new document is an original document. However, for existing documents, one or more changes may be detected when an updated document is submitted for processing or analysis. For example, when the original document was a notice document type, and the subsequently submitted updated document is an intermediate document type, one or more changes to the original document may be detected. According to exemplary aspects, changes in the updated document may be detected by matching keys of the extracted values. Changes in the updated document may include amendments against the original document. In an example, amendments may include, without limitation, new information, restatements, unchanged values, deleted values, corrections and errors, and clarifications. According to further aspects, changes detected may be an amendment to a value between adjacent versions of a single document, or may be a temporal change, which may be a change that is with respect to the latest version of the respective document.

More specifically, according to exemplary aspects, temporal analysis may be performed in operation 405 to determine change in one or more values within a document being analyzed with respect to time. According to exemplary aspects, changes to the one or more values may be detected using amended values within the document being analyzed or the delegated or cited document. In an example, temporal analysis for detecting of temporal changes may be performed at fixed intervals or in response to particular dates or events. At each of the intervals, particular dates or particular events, information for various entities and documents included in a corpus may be gathered for identification of temporal changes.

If no changes are detected in operation 405, the method proceeds to operation 406. According to exemplary aspects, original documents may not include any changes as changes are detected with respect to original values. In operation 406, one or more notices, citations, delegations and/or links may be identified, and corresponding nodes may be generated. According to exemplary aspects, the identified citations or delegations may be with respect to an existing document within the corpus or with respect to a future document that is expected to be added to the corpus. Upon identifications of the one or more notices, citations, delegations and/or links, and generation of corresponding nodes, the method proceeds to operation 407. Alternatively, if changes are detected in operation 405, the method proceeds to operation 407.

In operation 407, temporal information of the document being analyzed is identified or acquired. According to exemplary aspects, temporal information of the document may refer to origination date or modification date of the respective document. Based on the identified or obtained temporal information, the DCNG system determines the document's relationship with other documents or entities in a corpus. For example, if the document being analyzed is determined to have originated or modified earlier than a node that is already present in the dynamic graph network, respective node of the document being analyzed may be placed ahead of the already present node to retain correct timeline of documents, regardless of when each of the documents in the corpus is being read/analyzed or added to the corpus. Moreover, based on the temporal information obtained or identified in operation 407 and the changes detected in operation 405, a determination of whether the document being analyzed is an updated document of an existing document or not. Further, based on the temporal information obtained or identified, DCNG system may be able to determine order of versions existing for the respective document. For example, if both amendment 1 and amendment 2 to document 2 were added to the corpus at the same time, the DCNG system may still identify which version is the earlier or later version of the document based on the temporal information identified or obtained in operation 407.

In operation 408, based on the results of operation 405 and the temporal information of 407, a node status identifier may be set or modified. For example, if the document being analyzed is determined to be an original version of the document, the status identifier may indicate "Original." On the other hand, if the document being analyzed is determined to be a modified or updated version of an existing document of the corpus, the status identifier may indicate a modification of an existing document along with its versioning information. For example, the status identifier for the modified or updated version of the existing document may indicate "Amendment 1", "Amendment 2" and so forth based on the temporal information obtained in operation 407. Although exemplary status identifiers are provided above, aspects of the present disclosure are not limited thereto, such that status identifiers may be provided in any suitable manner to indicate a proper status of the document corresponding to the node of the dynamic graph network.

In operation 409, one or more edges are generated for the generated nodes. According to exemplary aspects, an edge may be generated for each citation present in the document. Moreover, when a node is updated or modified, additional citations to other documents may be included, which may spur generation of additional edges. According to further aspects, citations present in the document may reference another document already existing in the corpus or a document that will be created and/or added to the corpus at a later time. Accordingly, the generated edge may point to a node corresponding to an existing document or a place holder node for a document that may be created or added to the corpus at a later time. Once the future document is created at a later time, the place holder node may become a valid or normal node and point to the respective document.

In operation 410, connections between various nodes may be established using the generated edges. Moreover, existing connections may be revisited to establishing more connections where applicable. As exemplarily illustrated in FIG. 7B, when new document 5 and document 6 are added to the dynamic graph network, additional connections may also be formed with respect to the newly added document.

Accordingly, based on the exemplary aspects of the present disclosure, a graph network may be dynamically generated and modified without consideration of any particular read order of documents or even document presence in a corpus.

Figure 6:
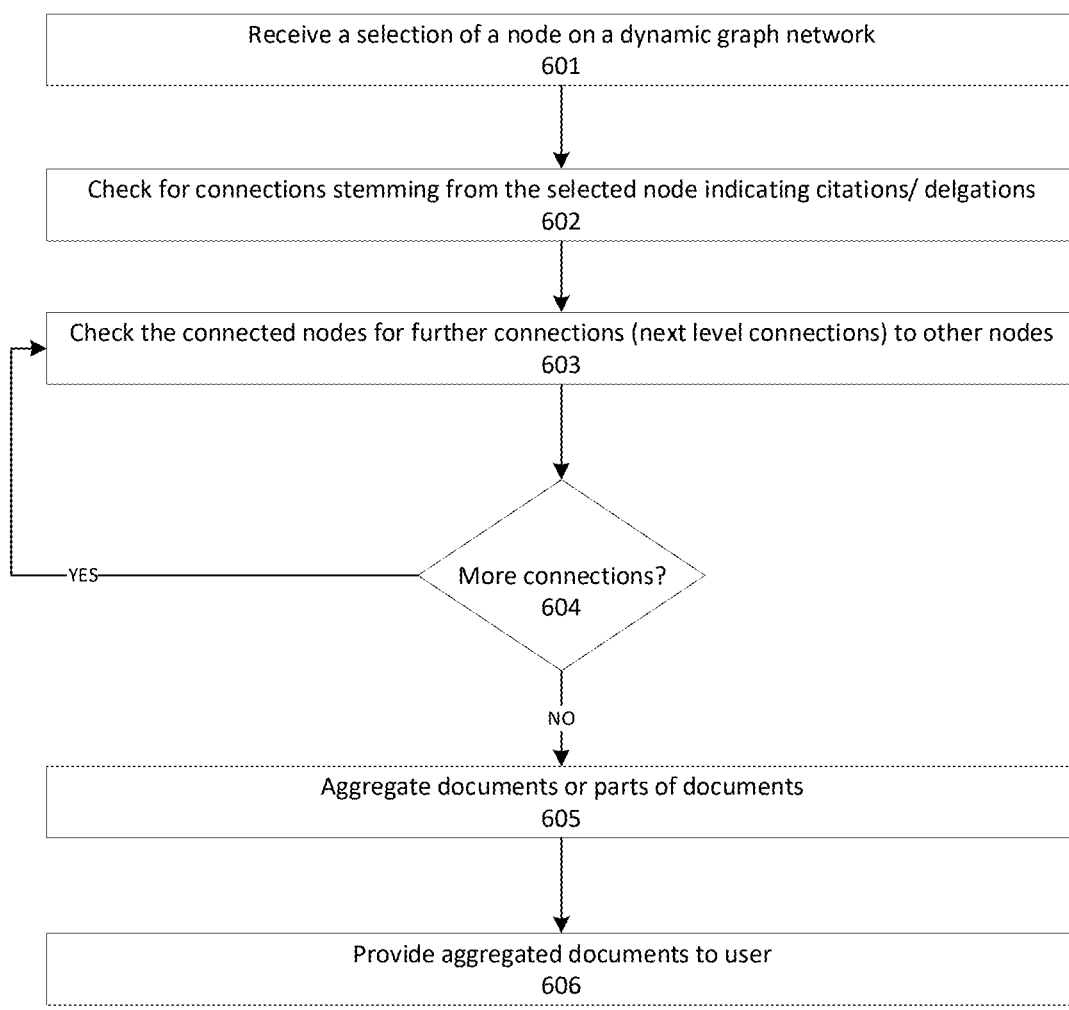
FIG. 6 illustrates a method for aggregating related documents for a single document using a dynamic graph network in accordance with exemplary embodiments of the present disclosure.

FIG. 6 illustrates a method for aggregating related documents for a single document using a dynamic graph network in accordance with exemplary embodiments of the present disclosure.

In operation 601, a user may select a node corresponding to a document on a dynamic graph network or the document itself for viewing. According to exemplary aspects, a selection on the document may automatically trigger a selection of a corresponding node on the dynamic graph network and cause the DCNG system to identify and aggregate related documents or information corresponding to the selected document.

In operation 602, DCNG system may check for any connections stemming from the selected node or document. For example, selection of a document or entity 1 on FIG. 7D may identify connections to document or entity 2 and document 3 or entity 3. According to exemplary aspects, when multiple versions of a document exist, current or existing connection may be identified. For example, in FIG. 7D, a current connection between entity 1 and the amendment 2 version of entity 2 may be identified.

In operation 603, the nodes connected (e.g., entity 2 and entity 3 of FIG. 7D) to the selected node (e.g., entity 1 of FIG. 7D) may be checked for further connections (or next level connections) to other nodes. For example, in FIG. 7D, the amendment 2 version of entity 2 is connected to entity 5 and entity 3 is connected to entity 4. Although not directly connected, it can be seen that entity 4 and entity 5 include related information to the selected entity 1.

Figure 7A:
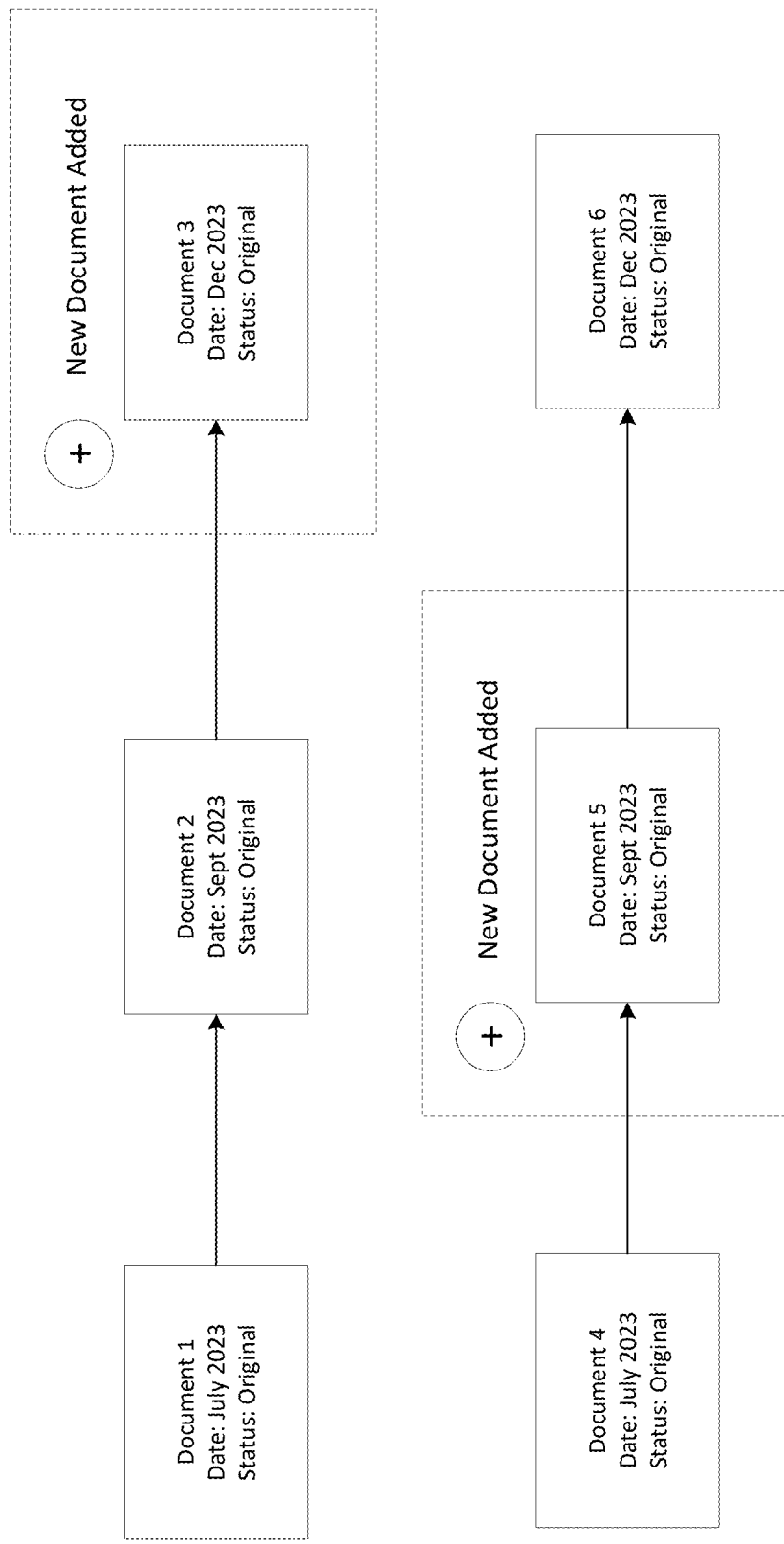
Figure 7B:
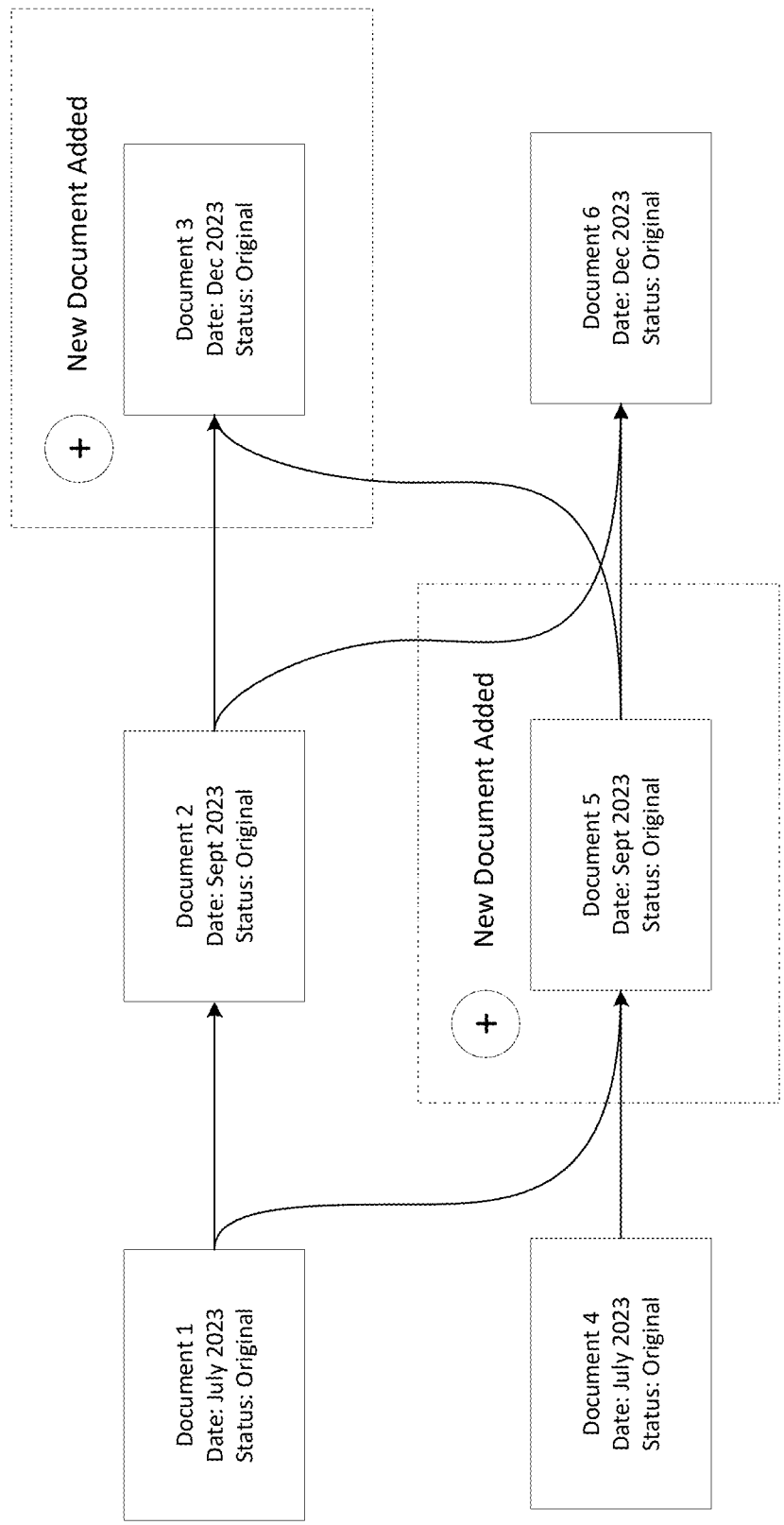
Figure 7D:
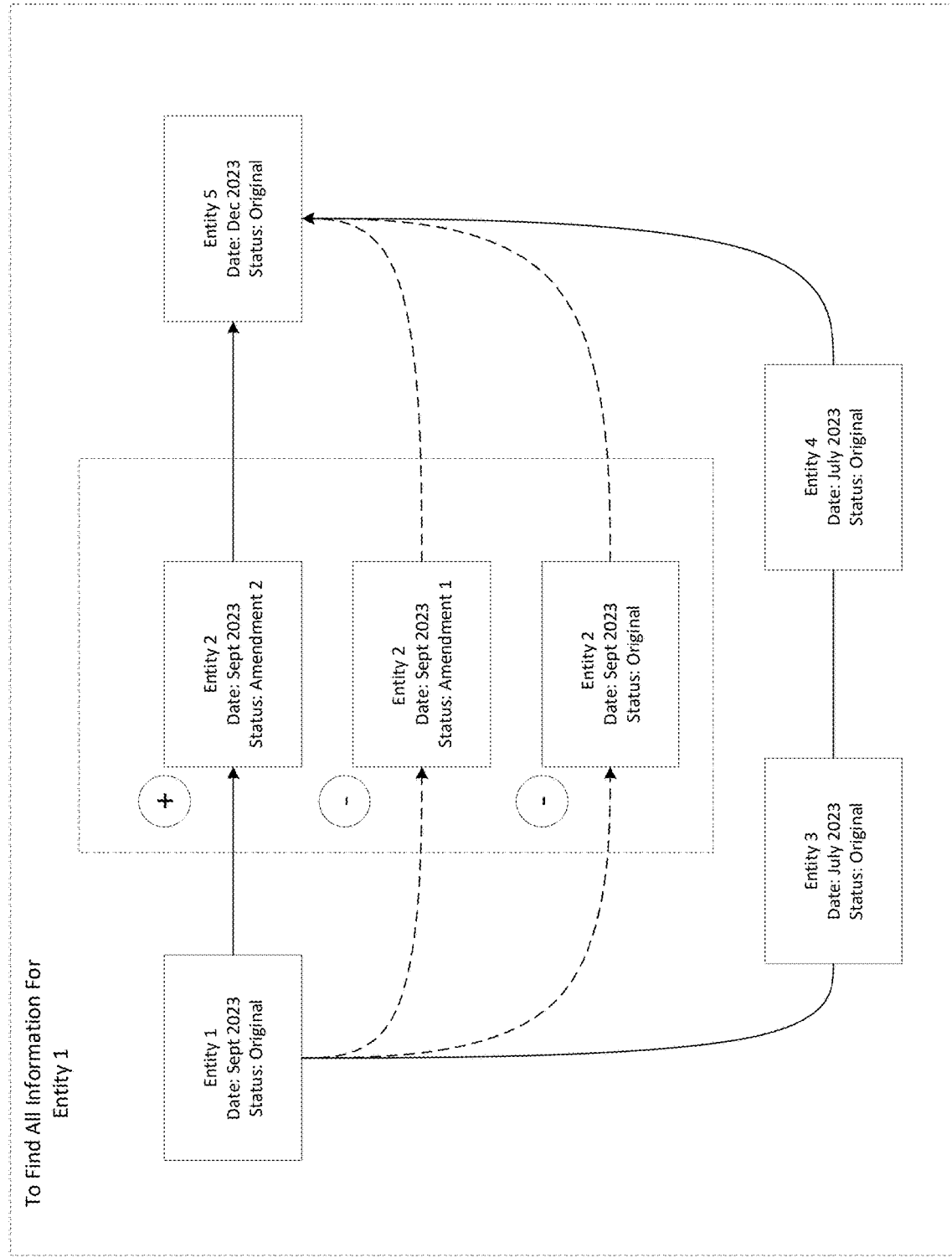

In operation 604, a check is performed to determine if there are any further connections remaining that may stem from the originally selected document or entity. Referring to FIG. 7D, it may be seen that although entity 5 may not have any further downstream connections, entity 4 further connects to entity 5. If further connection(s) is determined to remain in operation 604, operation 603 is repeated until a terminating entity, node or document is identified in the dynamic graph network. If no further connection(s) is determined to remain in operation 604, the method proceeds to operation 605.

In operation 605, entities or documents (or corresponding information) related to or stemming from the selected document or entity are aggregated. According to exemplary aspects, the entire document or targeted portion(s) of documents stemming from the selected document or entity may be aggregated. Moreover, the aggregated documents or information may indicate level of connection to the selected document or entity. For example, entity 4 may indicate that entity 4 is connected to entity 1 via entity 3.

In operation 606, the aggregated documents or corresponding information may be provided to the user to provide a holistic view of the selected entity or document. In an example, a modified document showing information of the selected document along with select information from the related documents may be provided. For example, instead of a citation, corresponding information may be directly displayed. Alternatively, a link to the corresponding document or portion of document within the corpus may be provided.

Figure 8:
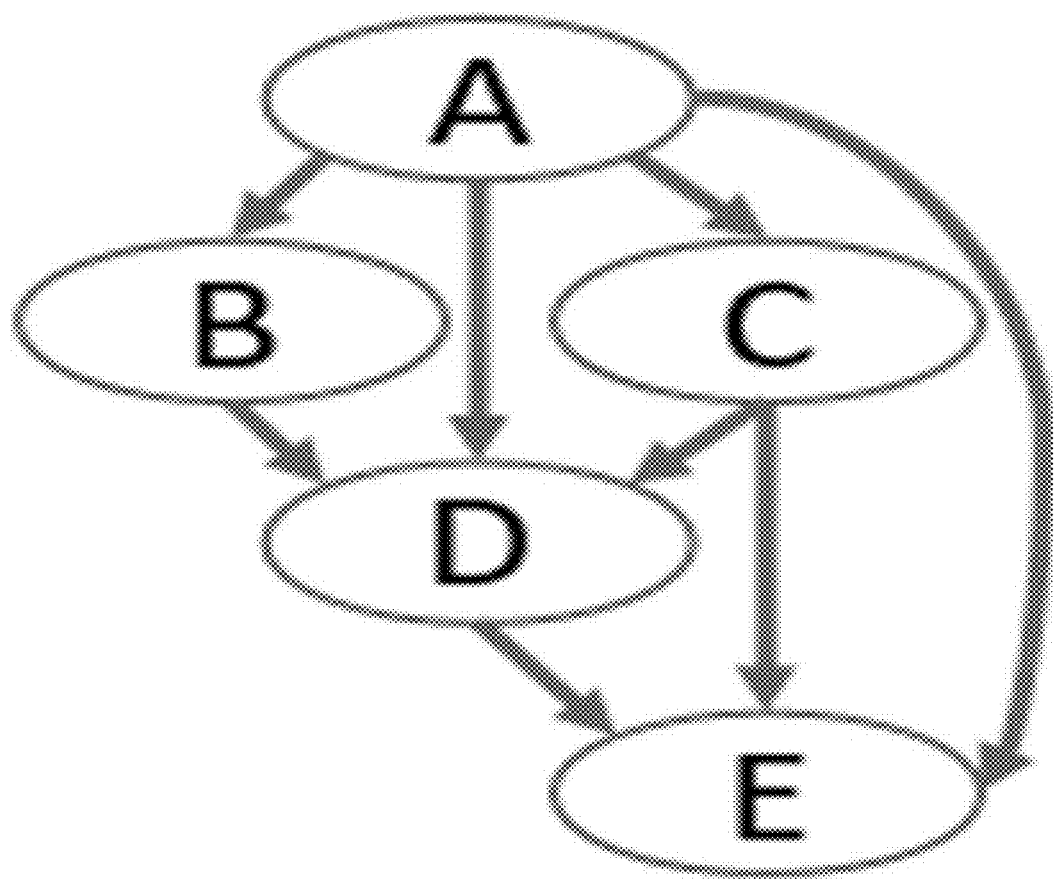
FIG. 8 illustrates an exemplary Directed Acyclic Graph (DAG).

FIGS. 7A-7E illustrate dynamically generated citation graph networks in accordance with exemplary embodiments of the present disclosure. FIG. 8 illustrates a Directed Acyclic Graph (DAG).

According to exemplary aspects, the graph network may be dynamic in that new vertices and edges may be added for each new document added to the corpus. Moreover, since documents may be added at different times, the graph network may constantly change at varying levels of the graph network. In contrast, conventional technology may utilize a strict citation rule, such that a document, once added, is immutable or not changeable for form a DAG. The DAG is exemplary illustrated in FIG. 8 may refer to a graph that can be topologically ordered, such that all references point backward in time, but never forward (i.e., no future citations). In other words, all of the edges are directional and can only go in a single direction. As exemplarily illustrated in FIG. 8, the top portion of the DAG may represent the past, and the bottom portion may represent the current timeframe. In an example, node A may be a node type document that delegates reporting to three different entities (B, C and E), of which, entity C may also delegate to entity D).

However, at least because documents may often be inserted and read in any order, documents may refer to nodes that have not been created yet. Such a scenario may not be accommodated by conventional technology, such as the DAG, which does not permit future citations. Moreover, because time steps are not uniform, documents may be added to the corpus at any time, which may not necessarily correspond to the sequential timeline as represented in DAG. For example, a last document added to the corpus may not necessarily be the most current document within the corpus. However, because DAG requires an immutable order that is generated or set upon adding of the document to the corpus, documents must be added in a specific order to reflect the proper direction of the edges. In addition, amendments, corrections and other updates may often be necessary to the initially generated documents, which may in turn require revisiting predefined nodes to update. However, for immutable graph network that are conventionally provided (e.g., DAG), such revisits to the predefined may not be feasible.

In view of these limitations, the dynamically generated graph network as exemplarily disclosed in the present disclosure addresses the above noted technical drawbacks in the conventional technology. Moreover, the dynamically generated graph network may be generated based on agnostic read order, such that new documents may be added at any point in the temporal citation graph and need not follow any particular document adding order as required in generating a conventional graph network, such as the DAG illustrated in FIG. 8. For example, as exemplarily illustrated in FIG. 7A, the dynamically generated graph network allows a newly added document 3 to be added at the last part of a graph network based on the document date, such that the document 2 dated September 2023 precedes the newly added document 3 dated December 2023. Alternatively, the newly added document may be added as an intervening document or node. As exemplarily illustrated in FIG. 7A, the newly added document 5 may be added as a node to be between document 4 and document 6. Although document 6 of December 2023 may have a later creation date than document 5 of September 2023, the document 5 may be added to a corpus later than document 6. In such a scenario, the later added document 5 may be added as an intervening node between document 4 and document 6 in the DCNG system. Accordingly, regardless of the document creation or modification date, a document may be added to the corpus in any order without regard to document creation or modification dates.

According to further aspects, the dynamically graph network generated via the DCNG system or method may provide an ability to revisit connections established between various nodes. For example, when a document that was ingested is known to have a previous citation, it may be revised with a new document code. Further, as illustrated in FIG. 7B, once the new documents are added to generate corresponding nodes in the dynamical graph network, new edges are established between the preexisting nodes (e.g., document 1, document 2, document 4 and document 6) and the newly added nodes (e.g., document 3 and document 5). According to exemplary aspects, documents may be added to a corpus at different times and in any particular order. For example, a document that may have been created earlier may be added to a corpus later that a later created document. As a document is added to the corpus, or as one or more citations are added to a document, one or more new nodes may be added to a graph network. Moreover, edges or connections between the nodes may be established and reestablished as a document is added to the corpus or as one or more citations are added to a document.

Moreover, if there are changes or amendments to a particular document, the amendments are reconciled and the edges or connections between the documents are established to connect to the most updated version of the document to bypass stale information included in previous versions of the respective document. According to exemplary aspects, the DCNG system or method provides chaining of amendments or changes to a document into a single object, which allows for information bypass to corrected or updated information, perform track changes within different versions of the respective document. For example, as illustrated in FIG. 7C, an original version (i.e., Status: Original) of document 1 node may be initially connected to an original version of the document 2, which in turn connected to an original version of document 3. Once document 2 is updated with amendment 1, edges or connections established with the original version of document 2 may be severed and the edges or connections may be established with amendment 1 version of document 2 (i.e., Status: Amendment 1). Similarly, once amendment 1 version of document 2 is modified or updated with amendment 2, edges or connections established with the amendment 1 version of document 2 may be severed and the edges or connections may be established with amendment 2 version of document 2 (i.e., Status: amendment 2). Accordingly, regardless of when the documents are added to the corpus, the most updated version of the respective document may establish a connection with other documents, such that stale information is bypassed. Although documents within a corpus are disclosed herein, aspects of the present disclosure are not limited thereto, such that the present disclosure may extend to code files and other files, entity, or the like.

Figure 5:
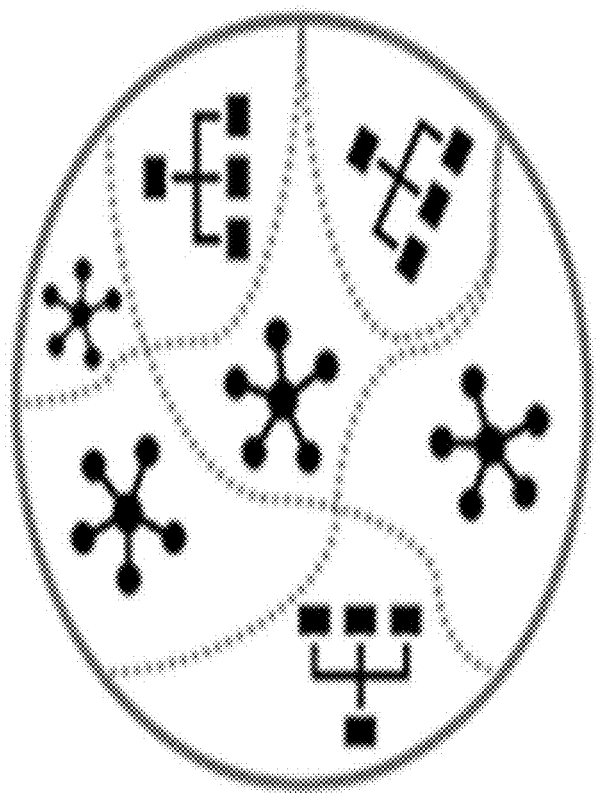
FIG. 5 illustrates clusters of documents having different structural configurations.

According to exemplary aspects, an entity may split its reporting across several documents or entities. Moreover, a dynamic graph network may allow delegated information to be aggregated based on connections to other entities or documents to provide a holistic viewpoint at any time. According to exemplary aspects, the DCNG system and/or method may perform data aggregation for a document by following a citation network across connected components of the node. In an example, a connected component subgraph may refer to any graph where all nodes are reachable from another. Further, citations may naturally induce multiple disjoint sets of nodes as illustrated in FIG. 5, such that there are many independent connected component graphs within a single time period. Aggregations may be completed by conducting a graph traversal over the citations and filtering to relevant information.

As illustrated in FIG. 7D, in order to find all information for entity 1, all of the citations or delegations to other entities may be identified. In this regard, citations to entity 2 and entity 3 may be identified. Moreover, citations included within the directly delegated entity 2 and entity 3 may be identified. More specifically, most current version of entity 2 is checked along with entity 3 for citations or further delegations. In this regard, the DCNG system and/or method further identify delegations and citations made by the most current version of entity 2, which will identify entity 5, and entity 3 that further delegates to entity 4, which in turn delegates to entity 5. Accordingly, to obtain or find all of the information corresponding to entity 1, delegated information in entity 2, entity 3, entity 4 and entity 5 must be processed or otherwise analyzed. In other words, information in entity 1 is dispersed across four other entities. Moreover, additional checks may be performed to ensure that the delegated information as well as further delegated information are from the most current version of the respective entity.

Further to the above, according to exemplary aspects, temporal analysis may be performed to determine change in one or more values within a document being analyzed with respect to time. According to exemplary aspects, changes to the one or more values may be detected using amended values within the document being analyzed or the delegated or cited document. In an example, temporal analysis for detecting of temporal changes may be performed at fixed intervals or in response to particular dates or events. At each of the intervals, particular dates or particular events, information for various entities and documents included in a corpus may be gathered for identification of temporal changes. As exemplarily illustrated in FIG. 7E, same analysis may be performed at each time stamp, such as prior time stamp (t−1), current time stamp (t) and next time stamp (t+1). Based on the gathered information at each of the time stamps, comparison may be performed to identify one or more changes in the gathered information with respect to time.

According to exemplary aspects, changes may be identified via amendments and temporal changes. More specifically, amendment based changes may be detected based on differences between the amendment and its adjacent version. In example, amendment based changes may include new, amended/modified or deleted information between two version of the document. Temporal changes may be similar, but different detected is against the latest version of a document across a timeline (as opposed within the document for an amendment). Temporal changes may be based on new, deleted or amended information.

According to exemplary aspects, the DCNG system and method is directed to providing a generative citation network to allow tracking versions and temporal changes across a document corpus, while accounting for inter-citations for delegations. More specifically, the present disclosure allows augmentation of corresponding document information when partial information is provided by one document and augmented by another within the temporal sub-graph, i.e., the same time period.

According to further aspects, the DCNG system and method provides outputs, including tracking temporal changes, version control, entity aggregation across filings with partial information and the like. Moreover, an algorithm executed by the DCNG system and method may be lightweight and dynamic in adding and retroactively altering the graph network as new documents are added to the corpus, even if they are amendments or revisions to past documents.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for generating a dynamic graph network for a plurality of documents in a corpus, the method comprising:

adding, by a processor, a first document into a corpus including a plurality of documents, wherein the plurality of documents have differing origination or modification dates from each other, and wherein the plurality of documents were added to the corpus in a random order;

analyzing, by a processor, a first document among the plurality of documents included in the corpus;

generating, by the processor, a first node for the first document in the dynamic graph network, wherein the dynamic graph network includes a plurality of nodes corresponding to the plurality of documents in the corpus;

extracting, by the processor, one or more values included in the first document;

assigning, by the processor, a key for each of the one or more values included in the first document;

identifying, by the processor, at least one entity for the one or more values extracted from the first document;

generating, by the processor, a second node for the at least one entity in the dynamic graph network;

setting, by the processor, a status identifier for each of the first node and the second node generated;

generating, by the processor, a first edge for the first node and the second node;

establishing, by the processor, a connection between the first node and the second node via the first edge;

adding, by the processor, a second document to the corpus,
wherein the second document is added to the corpus subsequent to the first document, and
wherein the second document is designated to the second node that was generated prior to the second document being added to the corpus;

updating, by the processor, the first document to generate an updated first document;

generating, by the processor, a third node for the updated first document;

severing, by the processor and in response to the updating of the first document, the connection between the first node and the second node established via the first edge;

generating, by the processor, a second edge for the third node and the second node;

establishing, by the processor, a connection between the third node and the second node via the second edge;

updating, by the processor, the status identifier for the second document to reflect an amendment to the first document;

reconciling, by the processor, the first document and the second document, such that the first document and the second document are linked while information included in the first document is bypassed;

receiving, by the processor, a selection of the first node of the dynamic graph network;

checking, by the processor, one or more connections stemming from the first node indicating a delegation to another document;

checking, by the processor, at least one connection of one or more nodes connected to the first node and identifying at least one connection to one or more other nodes that stems from the one or more nodes connected to the first node;

aggregating, by the processor, one or more documents corresponding to the one or more other nodes; and displaying, by the processor, the aggregated one or more documents to provide a holistic view of the first document.

2. The method according to claim 1, wherein the second document has an earlier origination date than the first document.

3. The method according to claim 1, wherein the second document has a later origination date than the first document.

4. The method according to claim 1, wherein a node is generated in the dynamic graph network prior to a corresponding document being added to the corpus.

5. The method according to claim 1, wherein the first document has an origination date that is later than at least one of the plurality of documents for which a node has not yet been generated.

6. The method according to claim 3, further comprising:
generating, by the processor, a fourth node for the second document;
inserting, by the processor, the fourth node between the first node and the second node;
severing, by the processor, the connection between the first node and the second node; and
establishing, by the processor, a connection between the first node and the fourth node and a connection between the fourth node and the second node.

7. The method according to claim 6, wherein an origination date of a document corresponding to the second node is later than the second document corresponding to the fourth node.

8. The method according to claim 6, wherein an origination date of a document corresponding to the second node is not yet established as the document corresponding to the second node is not yet added to the corpus.

9. The method according to claim 1, further comprising:
extracting, by the processor, one or more values included in the second document;
assigning, by the processor, a key for each of the one or more values included in the second document; and
detecting, by the processor, one or more changes in the second document based on one or more keys of the first document and one or more keys of the second document.

10. The method according to claim 1, wherein the one or more changes include an amendment to the first document or a temporal change between the second document and the first document.

11. The method according to claim 1, further comprising:
revisiting and reestablishing one or more connections of the first node when the second document is added to the corpus.

12. A system for generating a dynamic graph network for a plurality of documents in a corpus, the system comprising:
a memory; and
a processor,
wherein the system is configured to perform:

adding a first document into a corpus including a plurality of documents, wherein the plurality of documents have differing origination or modification dates from each other, and wherein the plurality of documents were added to the corpus in a random order;

analyzing a first document among the plurality of documents included in the corpus;

generating a first node for the first document in the dynamic graph network, wherein the dynamic graph network includes a plurality of nodes corresponding to the plurality of documents in the corpus;

extracting one or more values included in the first document;

assigning a key for each of the one or more values included in the first document;

identifying at least one entity for the one or more values extracted from the first document;

generating a second node for the at least one entity in the dynamic graph network;

setting a status identifier for each of the first node and the second node generated;

generating a first edge for the first node and the second node;

establishing a connection between the first node and the second node via the first edge;

adding a second document to the corpus,
wherein the second document is added to the corpus subsequent to the first document,
wherein the second document is an updated version of the first document, and
wherein the second document is designated to the second node that was generated prior to the second document being added to the corpus;

updating the first document to generate an updated first document;

generating a third node for the updated first document;

severing, in response to the updating of the first document, the connection between the first node and the second node established via the first edge;

generating a second edge for the third node and the second node;

establishing a connection between the third node and the second node via the second edge;

updating the status identifier for the second document to reflect an amendment to the first document;

reconciling the first document and the second document, such that the first document and the second document are linked while information included in the first document is bypassed;

receiving a selection of the first node of the dynamic graph network;

checking one or more connections stemming from the first node indicating a delegation to another document;

checking at least one connection of one or more nodes connected to the first node and identifying at least one connection to one or more other nodes that stems from the one or more nodes connected to the first node;

aggregating one or more documents corresponding to the one or more other nodes; and displaying the aggregated one or more documents to provide a holistic view of the first document.

13. A non-transitory computer readable storage medium that stores a computer program for generating a dynamic graph network for a plurality of documents in a corpus, when executed by a processor, causing a system to perform a plurality of processes comprising:

adding a first document into a corpus including a plurality of documents, wherein the plurality of documents have differing origination or modification dates from each other, and wherein the plurality of documents were added to the corpus in a random order;

analyzing a first document among the plurality of documents included in the corpus;

generating a first node for the first document in the dynamic graph network, wherein the dynamic graph network includes a plurality of nodes corresponding to the plurality of documents in the corpus;

extracting one or more values included in the first document;

assigning a key for each of the one or more values included in the first document;

identifying at least one entity for the one or more values extracted from the first document;

generating a second node for the at least one entity in the dynamic graph network;

setting a status identifier for each of the first node and the second node generated;

generating a first edge for the first node and the second node;

establishing a connection between the first node and the second node via the first edge;

adding a second document to the corpus,
  wherein the second document is added to the corpus subsequent to the first document,
  wherein the second document is an updated version of the first document, and
  wherein the second document is designated to the second node that was generated prior to the second document being added to the corpus;

updating the first document to generate an updated first document;

generating a third node for the updated first document;

severing, in response to the updating of the first document, the connection between the first node and the second node established via the first edge;

generating a second edge for the third node and the second node;

establishing a connection between the third node and the second node via the second edge;

updating the status identifier for the second document to reflect an amendment to the first document;

reconciling the first document and the second document, such that the first document and the second document are linked while information included in the first document is bypassed;

receiving a selection of the first node of the dynamic graph network;

checking one or more connections stemming from the first node indicating a delegation to another document;

checking at least one connection of one or more nodes connected to the first node and identifying at least one connection to one or more other nodes that stems from the one or more nodes connected to the first node;

aggregating one or more documents corresponding to the one or more other nodes; and displaying the aggregated one or more documents to provide a holistic view of the first document.

* * * * *